Figure 1:
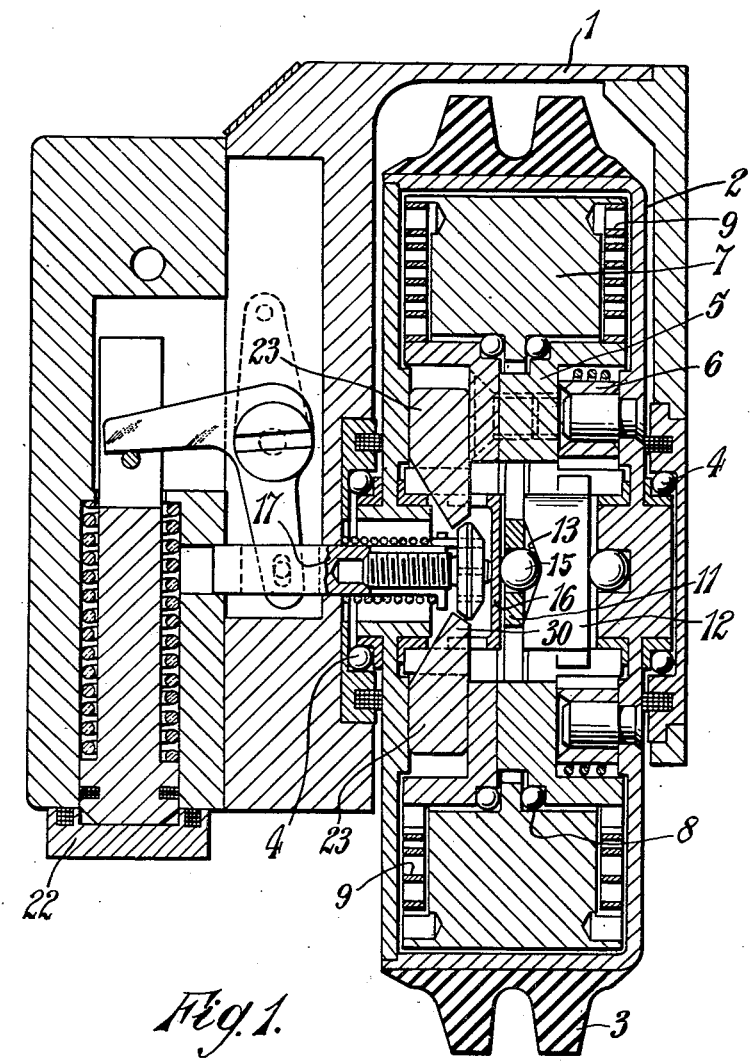

INVENTORS
Henry William Trevaskis
Frank Radcliffe Mortimer
by Benj. T. Clauber
their attorney

United States Patent Office 2,766,853
Patented Oct. 16, 1956

2,766,853

AUTOMATIC BRAKING APPARATUS FOR AIRCRAFT

Henry William Trevaskis, Solihull, and Frank Radcliffe Mortimer, Stivichale, Coventry, England, assignors to Dunlop Rubber Company Limited, London County, England, a British company Application May 25, 1954, Serial No. 432,228

Claims priority, application Great Britain May 30, 1953

4 Claims. (Cl. 188—181)

This invention relates to automatic braking apparatus and more particularly relates to the type of automatic braking apparatus described and claimed in our Patent No. 2,656,017.

In Patent No. 2,656,017 an apparatus is described for automatically regulating the fluid pressure supply to the fluid pressure operated brakes of aircraft landing wheels in such a manner as to provide the maximum deceleration of the aircraft without sliding or slipping of the landing wheels. The apparatus comprises a housing rotatable by one of said wheels, a drum-member rotatable on bearings within the housing, and an annular flywheel which is rotatable between the outer periphery of the drum-member and the inner periphery of the housing and which has a beam extending diametrically across its inner periphery and through two diametrically opposed arcuate slots extending through the periphery of the drum-member at the median plane thereof. A friction clutch is provided to drive the drum-member, the clutch itself being driven by the housing. A clock-type spring is fitted between the flywheel and the drum-member to urge the flywheel relative to the drum-member so that the flywheel beam normally abuts one end of each of the slots through the drum-member, and the flywheel is thus driven by the drum-member on rotation of the wheel. In this relative position of the flywheel and drum-member the brakes may be applied, but on sliding or skidding of the landing wheel the drum-member decelerates with the wheel whilst the inertia of the flywheel moves it against the spring to a position in which the braking pressure is cut off.

In the construction hereinabove described the flywheel is single-acting, i. e. it moves in one direction only relative to the drum-member from a "brakes-on" to a "brakes-off" position. This has certain disadvantages which, in accordance with the present invention, may be overcome by the substitution of a "double-acting" flywheel for the single-acting flywheel. Preferably the flywheel is balanced centrally in the "brakes-on" position between two clock-type springs, and relative movement of the flywheel and drum-member in either direction restricts the flow of pressure fluid to the brakes.

According to the present invention, apparatus for automatically controlling the braking pressure in a fluid pressure operated wheel brake is provided, which comprises a housing rotatable by a wheel, a member rotatable in and driven by said housing, a flywheel rotatable in said housing driven by and capable of limited angular displacement relative to said member, means to urge the flywheel into a position intermediate the limits of its displacement relative to said member, a valve mechanism adapted to be connected to a source of fluid pressure, to exhaust, and to said brake and means movable axially by said relative displacement to operate the valve mechanism and vary the braking pressure.

Preferably the flywheel is annular and is provided with a beam extending diametrically across the inner periphery thereof. The flywheel is rotatable on the outer periphery of a drum-member which is provided with two diametrically opposed segmental shaped stops, on the median plane, between which the beam extends. Two clock-type springs of exactly equal rating each have one end secured to the flywheel and the other end to the drum-member and act in opposite directions, thus balancing the flywheel relative to the drum-member so that the flywheel beam is centrally disposed between said pair of stops, and when so positioned the valve mechanism is operated to allow fluid pressure to flow therethrough from the source to the wheel brakes. On angular acceleration or deceleration of the flywheel relative to the drum-member the beam moves, against the force of one of the clock-type springs, towards one or other of the stops and in this position of the beam the valve mechanism is operated to reduce or prevent the passage of fluid pressure from the source to the brakes.

Figure 2:
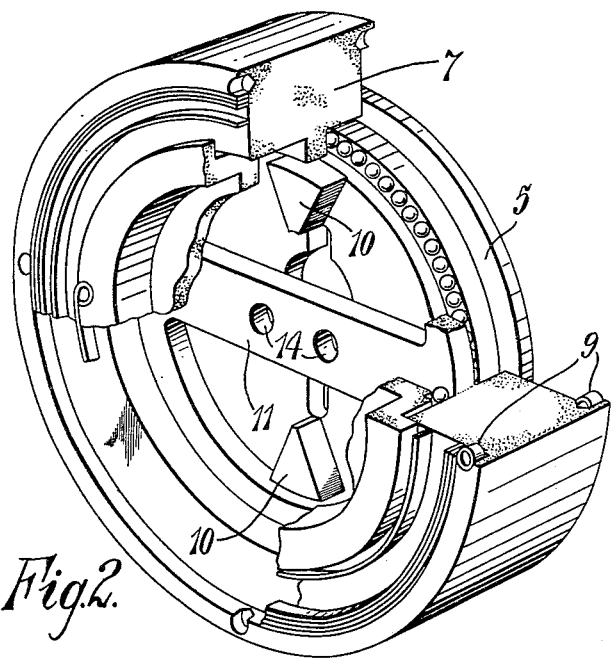
Figure 3:
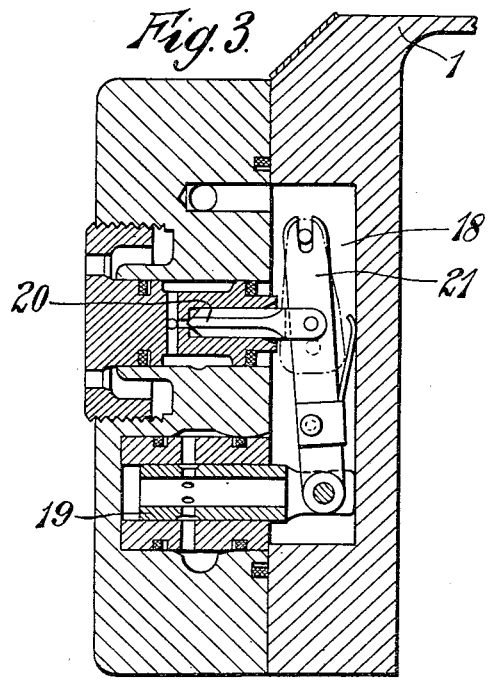

The invention will now be described as applied to an automatic brake control apparatus for aircraft, substantially of the type described in our Patent No. 2,656,017, and with reference to the accompanying drawings, of which:

Figure 1 is a sectional view of an automatic braking apparatus incorporating the device of the present invention and means to prevent the application of braking pressure before the wheels have rotated, Figure 2 is an exploded view, parts being broken away, of part of the apparatus of Figure 1, Figure 3 is a sectional view of the valve mechanism of the automatic braking apparatus.

The apparatus comprises a bracket 1 (Figure 1) adapted to be mounted on a non-rotatable part of a landing wheel and brake assembly having a hollow, cylindrical housing 2 rotatable therein. The housing is provided, on its outer periphery, with a rubber tyre 3 which in operation frictionally engages with a rotatable part of the wheel, whereby the housing 2 is rotatable by the wheel. Rotatable on bearings 4 within the housing and coaxial therewith is an annular drum-member 5 and associated with the drum-member is a friction clutch 6 which is driven by the housing 2 and drives the drum-member 5. The clutch 6 is more fully described in our application Serial No. 402,482, dated January 6, 1954, now abandoned, and is so arranged that on relatively angular movement between the drum-member and housing in one direction a heavy torque is obtained and relative angular movement in the opposite direction produces a light torque.

An annular flywheel 7 is located between the outer periphery of the drum-member 5 and the inner periphery of the housing 2 and said flywheel is rotatable on bearings 8 carried by the drum-member. The two radially extending sides of the flywheel 7 are recessed and located in each of said recesses is a clock-type spring 9, one end thereof being secured to the flywheel 7 adjacent the outer periphery thereof and the other end being secured to the outer periphery of the drum-member 5. The springs 9 are of exactly equal rating and act in opposite directions so that, with all the parts stationary, the flywheel is balanced and does not move relative to the drum-member.

The drum-member 5 is provided, at the median plane thereof, with two diametrically-opposed segmental shaped stops 10 (Figure 2) and a beam 11 integral with the flywheel and extending diametrically across the inner periphery thereof, is fitted between said stops 10, the arrangement being such that in the static position the flywheel beam 11 is centrally disposed relative to each of said stops and relative angular movement of the order of 60° between the drum-member and flywheel is possible in either direction before the flywheel beam abuts either of said stops.

A cylindrical cam-member 12 is fitted within the inner periphery of said drum-member and is rotatable therewith. The cam-member 12 is located on one side of the flywheel beam 11, and the side of the cam-member adjacent said beam is provided with a shallow recess 13 of V-section extending diametrically thereacross. The flywheel beam is provided with two equi-sized holes 14, equi-spaced one on each side of the centre thereof and a ball 15 is located in each of said holes 14, said balls 15 being seated in the bottom of the recess 13 in the cam-member 12 when the flywheel beam 11 is centrally disposed relative to the stops 10, in which position it is held, when the drum-member 5 and flywheel 7 are relatively stationary, by the opposed clock-type spring 9.

A disc 16, co-axial with the drum-member 5, abuts the centre of the flywheel beam 11, on the side thereof remote from the cam-member 12 and one end of a non-rotatable operating rod 17 is spring-urged into contact with said disc 16. The other end of the operating rod 17 is slidably fitted in a hole in one arm of the bracket 1 in which the housing 2 is mounted. Associated with said arm of the bracket 1 is a valve mechanism (Figure 3) comprising a pressure chamber 18 operatively connected to the wheel brakes, an inlet valve 19 leading into said pressure chamber 18 and communicating through a pilot's control with a source of fluid pressure, and an exhaust valve 20 connecting the pressure chamber 18 with a fluid reservoir. The inlet and exhaust valves are interconnected by a valve beam 21 in the pressure chamber 18, and said valve beam 21 is operatively connected to the operating rod 17 which controls the movement of the valve beam 21 and associated valves 19 and 20. With the balls 15 of the flywheel beam 11 seated in the bottom of their recess 13 the operating rod 17 is in such a position that the inlet valve is open and the exhaust valve shut. The valve mechanism is more fully described in our Patent No. 2,656,017.

The operation of the apparatus is as follows. As each wheel of the aircraft rotates on landing it rotates the housing 2 associated therewith. The housing, acting through the friction clutch 6, spins up the drum-member 5 until it is rotating at the same speed as the housing 2. Assuming the flywheel beam 11 to be in its balanced mid-position, the first 60° of angular movement of the drum-member will cause the stops 10 to abut the sides of the beam 11, whereupon the flywheel 7 will be driven at the same speed as the drum-member. On relative angular movement between the flywheel 7 and drum-member 5 one of the clock-type springs 9 is compressed and the other one tensioned and at the same time the balls 15 located in the two holes 14 of the flywheel beam 11 move up the inclined sides of the V-shaped recess 13 in the cam-member 12 which is rotatable with the drum-member. The balls 15 thus move axially through said holes 14 and, abutting the disc 16 on the other side of the flywheel beam, move the disc 16 and also move the operating rod 17, which has one end spring-urged into contact with the disc 16 into such a position that the inlet valve 19 of the valve mechanism is shut and the exhaust valve 20 open.

As soon as the flywheel 7 is rotating at the same speed as the drum-member 5, which is immediately after the stops in the drum-member abut the flywheel beam, the two clock-type springs 9, one in compression and one in tension, take charge and move the flywheel 7 back until the beam 11 is central between the stops. The balls 15 are forced back into the bottom of their associated recess 13 by the spring-loaded operating rod 17 until said rod 17 is in a position wherein the inlet valve 19 is open and the exhaust valve 20 closed. This entire operation takes place within a fraction of a second of the wheel first rotating on landing.

The braking pressure may then be applied through the pilot's control and this pressure flows through the open inlet valve 19 of the valve mechanism and thence to the wheel brake to decelerate the wheel, in the manner described in our Patent No. 2,656,017. It may happen, however, that one or more of the landing wheels "bounce" during the landing run and after the brakes have been applied. With the weight of the aircraft off the wheel it will immediately lock due to the applied braking pressure and the housing will decelerate with the wheel. The flywheel 7, however, due to its inertia will continue to run on, the clutch mechanism 6 providing only a light torque in this direction to allow the flywheel to rotate for a predetermined period of time. The flywheel beam 11 moves round 60° relative to the drum-member 5 on the wheel locking, thus closing the inlet valve 19 and opening the exhaust valve 20 in the manner described above, and this relieves the braking pressure at the wheel brake. When the wheel touches down once more it is not locked but is freely rotatable, providing only that the bounce is not of excessive duration and the flywheel is still rotating when the bounce terminates.

As soon as the wheel touches down once more it spins up until it is rotating at an angular velocity commensurate with the ground speed of the aircraft. During the bounce, however, the flywheel has been decelerating, and after the bounce finishes may be rotating e. g. at only half its original angular velocity or even less. With a single acting flywheel, of the type described in our Patent No. 2,656,017, the brake would be re-applied as soon as the speed of the accelerating housing caught up with that of the decelerating flywheel, which may be rotating at an angular velocity of only half that commensurate with the aircraft landing speed, and this would cause excessive braking pressure with sliding of the wheel and then further rectification of the braking pressure. With the present double-acting flywheel, however, as the wheel spins up on touching down the flywheel beam 11 is abutting the stops, the inlet valve 19 of the valve mechanism being closed and the exhaust valve 20 open, until the housing speed first matches and then exceeds the flywheel speed, when the flywheel beam 11 will move to abut the other side of the stops, the inlet valve still being closed and the exhaust valve open. The inlet valve is opened for a fraction of a screen when the beam 11 swings through the mid-position of the stops, but the burst of pressure to the brakes is too momentary to be of any practical effect.

When the landing wheel is rotating once more at the true ground speed of the aircraft and the flywheel is rotating freely with the housing, the two clock-type springs 9 will again take charge to move the flywheel beam 11 back to its mid-position, thus opening the inlet valve and closing the exhaust valve and allowing the brakes to be re-applied.

The double-acting flywheel of the present invention thus differs from the flywheel described in our prior specification in that the inlet valve 19 of the valve mechanism is opened and the exhaust valve 20 closed only when the flywheel beam 11 is in a mid-position between the stops of the drum-member, i. e. when the flywheel is rotating freely at the same angular velocity as the drum-member. When the flywheel and drum-member are either accelerating or decelerating relative to one another then the inlet valve is closed to prevent the brakes from being applied. This is not only an advantage when the aircraft bounces, as described, but is of particular advantage at the end of a long bounce, when the flywheel is rotating very slowly, since it prevents the application of the brakes at the flywheel speed and applies them only when the flywheel is rotating at the same speed as the housing and the flywheel beam is centralized between the stops of the drum-member.

Apparatus incorporating the double-acting flywheel of the present invention may also be used in conjunction with a device for preventing the application of the brakes before the landing wheels rotate on touching down.

This device (see Fig. 1) is more fully described in our patent application Serial No. 313,572, dated October 7, 1952, and comprises a fluid pressure operated mechanism 22 actuated automatically on movement of the aircraft undercarriage to lock the operating rod 17 between a pair of inwardly-sprung centrifugal releases 23 associated with the drum-member 5. As the landing wheel rotates on touching down the drum-member is spun and the releases move outwardly to unlock the operating rod, thereby opening the inlet valve of the valve mechanism and closing the exhaust valve. With this apparatus and device the pilot may safely apply the braking pressure through his control before the aircraft actually lands.

The centrifugally operated releases are usually arranged to open when the housing and drum-member are spinning at a rate corresponding to a landing speed of the order of 50 M. P. H. The touchdown speed of the aircraft frequently exceeds this speed, and may be of the order of 120 M. P. H. Thus with a single-acting flywheel the brakes will be applied as soon as the wheel accelerates up to the speed required to disengage the releases. This may be considerably below the true landing speed with the result that the wheel will skid or slide until the automatic apparatus has corrected the braking pressure. With the double-acting flywheel of the present invention, however, the flywheel beam will move from one end of the slots, to the other, i. e. through the "brakes-on" mid-position, when the two opposed clock-springs will centralize the beam relative to the slots in the drum-member to open the inlet valve and allow the braking pressure to flow to the brakes.

Having described our invention, what we claim is:

1. Apparatus for automatically controlling the braking pressure in a fluid pressure operated wheel brake comprising a housing rotatable by a wheel, a member rotatable in and driven by said housing, a flywheel rotatable in said housing and driven by said member and capable of limited angular displacement relative to said member, resilient means between said member and said flywheel to bias said flywheel to a mid-position relative to the limits of its angular position relative to said member and a brake control actuating element displaceable to effect control by relative displacement of said flywheel from said mid-position relative to said member.

2. Apparatus according to claim 1 comprising two coil springs each having one end secured to the flywheel and the other end secured to said member, said springs being oppositely wound and operative on the flywheel to urge it into a predetermined angular position relative to said member.

3. Apparatus according to claim 2 comprising two stops formed at diametrically opposed locations on said member and a lever extending diametrically across said flywheel to engage said stop to limit the angular displacement of said flywheel relative to said member from said predetermined angular position.

4. The apparatus of claim 1 in which said brake control actuating element comprises a cam having surfaces sloping equally from a central point and a cam follower actuated by said cam.

References Cited in the file of this patent

UNITED STATES PATENTS

| | | |
|---|---|---|
| 2,447,709 | McCune | Aug. 24, 1948 |
| 2,531,054 | Kelley | Nov. 21, 1950 |
| 2,656,017 | Trevaskis | Oct. 20, 1953 |